United States Patent
Lardjane et al.

(10) Patent No.: US 9,902,204 B2
(45) Date of Patent: *Feb. 27, 2018

(54) TYRE WITH LIGHTENED BELT STRUCTURE INCLUDING STEEL MONOFILAMENTS

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Aurore Lardjane, Clermont-Ferrand (FR); Christophe Le Clerc, Clermont-Ferrand (FR); Jacques Morel-Jean, Clermont-Ferrand (FR); Arnaud Verleene, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 685 days.
This patent is subject to a terminal disclaimer.

(21) Appl. No.: 14/372,947

(22) PCT Filed: Jan. 31, 2013

(86) PCT No.: PCT/EP2013/051845
§ 371 (c)(1),
(2) Date: Jul. 17, 2014

(87) PCT Pub. No.: WO2013/117477
PCT Pub. Date: Aug. 15, 2013

(65) Prior Publication Data
US 2015/0007922 A1  Jan. 8, 2015

(30) Foreign Application Priority Data
Feb. 9, 2012 (FR) .................... 12 51217

(51) Int. Cl.
*B60C 9/22* (2006.01)
*B60C 9/20* (2006.01)
(Continued)

(52) U.S. Cl.
CPC .......... *B60C 9/0042* (2013.01); *B60C 9/0064* (2013.01); *B60C 9/2009* (2013.01);
(Continued)

(58) Field of Classification Search
CPC ....... B60C 9/0064; B60C 9/2009; B60C 9/22; B60C 2009/2067; B60C 2009/2077;
(Continued)

(56) References Cited

U.S. PATENT DOCUMENTS 3,929,180 A  12/1975  Kawase et al.
4,371,025 A  2/1983   Canevari et al.
(Continued)

FOREIGN PATENT DOCUMENTS

DE  10 2009 025 793 A1  8/2010
EP  0 414 892 A1 *  3/1991
(Continued)

OTHER PUBLICATIONS

English machine translation of JP 1-229704 A, Sep. 13, 1989.*

*Primary Examiner* — Adrienne C Johnstone
(74) *Attorney, Agent, or Firm* — Fitzpatrick, Cella, Harper & Scinto

(57) ABSTRACT

A radial tire includes a crown reinforcement or belt having a lightened belt structure. The lightened belt structure is constructed of a multilayer composite laminate that includes a first layer of rubber that radially surmounts, in a direction Z, two other layers of rubber. The first layer of rubber is reinforced with first reinforcers, which are circumferential heat-shrinkable polyester textile reinforcers. The two other layers of rubber are reinforced with second and third rein- (Continued)

forcers, which are monofilaments of high tensile steel. The first reinforcers have a diameter between 0.40 mm and 0.70 mm and a density between 70 and 130 threads/dm, and the second and third reinforcers have a diameter between 0.20 mm and 0.50 mm and a density between 120 and 180 threads/dm.

17 Claims, 2 Drawing Sheets

(51) Int. Cl.
*B60C 9/18* (2006.01)
*B60C 9/00* (2006.01)
(52) U.S. Cl.
CPC ........ *B60C 9/22* (2013.01); *B60C 2009/2012* (2013.01); *B60C 2009/2016* (2013.01); *B60C 2009/2067* (2013.01); *B60C 2009/2077* (2013.01); *B60C 2009/2083* (2013.01); *B60C 2009/2247* (2013.01); *B60C 2009/2257* (2013.01); *B60C 2009/2266* (2013.01)
(58) Field of Classification Search
CPC .... B60C 2009/2247; B60C 2009/2257; B60C 2009/2266
USPC ................................ 152/527, 451, 526, 531
See application file for complete search history.

(56) References Cited

U.S. PATENT DOCUMENTS

| | | | |
|---|---|---|---|
| 4,819,705 A | | 4/1989 | Caretta |
| 5,032,198 A | * | 7/1991 | Kojima |
| 5,365,781 A | * | 11/1994 | Rhyne |
| 5,427,166 A | * | 6/1995 | Willard, Jr. |
| 5,511,599 A | * | 4/1996 | Willard, Jr. |
| 5,711,829 A | * | 1/1998 | Pollard |
| 5,858,137 A | * | 1/1999 | Assaad ................ B60C 9/0064 |
| | | | 152/527 X |
| 6,105,647 A | * | 8/2000 | Champilou |
| 6,581,662 B2 | * | 6/2003 | Yukawa .................... B60C 9/22 |
| | | | 152/531 X |
| 6,923,234 B2 | * | 8/2005 | Bestgen |
| 2011/0240199 A1 | | 10/2011 | Reese et al. |
| 2014/0069563 A1 | | 3/2014 | Le Clerc |
| 2015/0013873 A1 | * | 1/2015 | Lardjane .............. B60C 9/0064 |
| | | | 152/527 |

FOREIGN PATENT DOCUMENTS

| | | |
|---|---|---|
| EP | 0 738 615 A2 | 10/1996 |
| EP | 0 795 426 A1 | 9/1997 |
| EP | 1 066 989 A2 | 1/2001 |
| EP | 1 162 086 A2 | 12/2001 |
| EP | 1 184 203 A2 | 3/2002 |
| FR | 2 504 067 A | 10/1982 |
| JP | 01229704 A * | 9/1989 |
| JP | 2002-029214 A | 1/2002 |

* cited by examiner

TYRE WITH LIGHTENED BELT STRUCTURE INCLUDING STEEL MONOFILAMENTS

FIELD OF THE INVENTION

The present invention relates to tyres and to the crown reinforcement or belt thereof. It relates more specifically to the multilayer composite laminates used in the belt of tyres notably for passenger vehicles or vans.

PRIOR ART

A tyre with a radial carcass reinforcement for a passenger vehicle or van comprises, as is known, a tread, two inextensible beads, two flexible sidewalls connecting the beads to the tread and a rigid crown reinforcement or "belt" arranged circumferentially between the carcass reinforcement and the tread.

The tyre belt is generally made up of at least two rubber plies referred to as "working plies", "triangulation plies" or even "working reinforcement" which are superposed and crossed, usually reinforced with metal cords arranged substantially parallel to one another and inclined with respect to the median circumferential plane, it being possible for these working plies to be associated or not to be associated with other plies and/or fabrics in rubber. These working plies have the prime function of giving the tyre high drift thrust or cornering stiffness which in the known way is necessary for achieving good road holding ("handling") on the motor vehicle.

The above belt, and this is particularly true of tyres liable to run sustained high speeds, may further comprise a rubber ply referred to as "hooping ply" or "hoop reinforcement" which is generally reinforced with reinforcing threads referred to as "circumferential", which means to say that these reinforcing threads are arranged practically parallel to one another and extend substantially circumferentially around the tyre casing to form an angle preferably comprised in a range from 0 to 5° with the median circumferential plane. These circumferential reinforcing threads have the prime function, it will be recalled, of resisting the centrifuging of the crown at high speed.

Such belt structures, which ultimately consist of a multilayer composite laminate comprising at least one hooping ply, usually textile, and two working plies, generally of metal, are well known to those skilled in the art and do not need to be described in greater detail here.

The prior art describing such belt structures is illustrated in particular by patent documents U.S. Pat. No. 4,371,025, FR 2 504 067 or U.S. Pat. No. 4,819,705, EP 738 615, EP 795 426 or U.S. Pat. No. 5,858,137, EP 1 162 086 or US 2002/0011296, EP 1 184 203 or US 2002/0055583.

The availability of increasingly strong and durable steels means that tyre manufacturers are nowadays, as far as possible, tending towards the use in tyre belts of cords of a very simple structure, notably having just two threads, or even of individual filaments, in order on the one hand to simplify the manufacture and reduce costs, and on the other hand to reduce the thickness of the reinforcing plies and thus the hysteresis of the tyres, and ultimately reduce the energy consumption of the vehicles fitted with such tyres.

Efforts aimed at reducing the mass of the tyres, particularly by reducing the thickness of their belt and of the layers of rubber of which it is made do, however, and quite naturally, come up against physical limits which may give rise a certain number of difficulties. Notably, the hooping function afforded by the hooping reinforcement and the stiffening function afforded by the working reinforcement may turn out no longer to be sufficiently differentiated from one another and may disturb one another, not to mention the risks of direct contact between the textile circumferential threads and the metal cords of the working plies. Of course, all of that is detrimental to the correct operation of the tyre crown, and to the performance and overall endurance of the tyre.

BRIEF DESCRIPTION OF THE INVENTION

Now, during the course of their research, the applicant companies have found a multilayer composite laminate of a specific structure that allows the belt of the tyres to be lightened appreciably, thus lowering their rolling resistance, while at the same time alleviating the abovementioned disadvantages.

Thus, a first subject of the present invention relates (according to the references given in the attached FIGS. 1 and 2) to a radial tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) anchored in each of the beads (5) and extending in the sidewalls (4) and the crown (2), a crown reinforcement or belt (10) extending in the crown (2) in the circumferential direction (X) and situated radially between the carcass reinforcement (7) and the tread (3), the said belt (10) comprising a multilayer composite laminate (10a, 10b, 10c) comprising at least three superposed layers of reinforcers (110, 120, 130), the said reinforcers being unidirectional within each layer and embedded in a thickness of rubber (C1, C2, C3), with:

on the tread side, a first layer (10a) of rubber (C1) comprising a first row of reinforcers (110) which are oriented at an angle alpha of −5 to +5 degrees with respect to the circumferential direction (X), these reinforcers (110) referred to as first reinforcers being made of a heat-shrinkable textile material;

in contact with the first layer (10a) and arranged underneath the latter, a second layer (10b) of rubber (C2) comprising a second row of reinforcers (120) which, oriented at a given angle beta, positive or negative, are comprised between 10 and 30 degrees with respect to the circumferential direction (X), these reinforcers (120) referred to as secondary reinforcers being metal reinforcers;

in contact with the second layer (10b) and arranged underneath the latter, a third layer (10c) of rubber (C3) comprising a third row of reinforcers (130) which are oriented at an angle gamma the opposite of the angle beta, itself comprised between 10 and 30 degrees with respect to the circumferential direction (X), these reinforcers (130) referred to as third reinforcers being metal reinforcers;

this tyre being characterized in that:

the heat-shrinkable textile material of the first reinforcers (110) is a polyester;

the mean envelope diameter D1 of the first reinforcers (110) is comprised between 0.40 mm and 0.70 mm;

the density $d_1$ of the first reinforcers (110) in the first layer of rubber (C1), measured in the axial direction (Y), is comprised between 70 and 130 threads/dm;

the second (120) and third (130) reinforcers consist of steel monofilaments of which the diameter, denoted D2 and D3 respectively, is comprised between 0.20 mm and 0.50 mm;

the density, $d_2$ and $d_3$ respectively, of the second (120) and third (130) reinforcers in the second (C2) and third (C3) layers of rubber respectively, measured in the axial direction (Y), is comprised between 120 and 180 threads/dm.

By virtue of its specific construction and the combination of the above features, this multilayer composite laminate has proven itself capable of reducing the weight of tyres and their rolling resistance, at a cost that is lower by virtue of the use of steel monofilaments that do not require any prior assembling operation, all this being achieved without penalizing the cornering stiffness or the endurance under particularly harsh running conditions.

It also offers the advantage of having very low hysteresis in comparison with the laminates conventionally used in the belts of tyres of the passenger vehicle or van type.

The multilayer composite laminate according to the invention can be used as a belt reinforcing element for any type of tyre, particularly for passenger vehicles notably including 4×4s and SUVs (Sport Utility Vehicles) or for vans.

BRIEF DESCRIPTION OF THE DRAWINGS

The invention and the advantages thereof will be readily understood from the detailed description and exemplary embodiments which follow, and from FIGS. 1 and 2 relating to these embodiments and which (without being drawn to any particular scale unless otherwise indicated) schematically depict:

in radial section (which means a section in a plane containing the axis of rotation of the tyre), an example of a tyre (1) according to the invention, incorporating within its belt (10) a multilayer composite laminate according to the invention (FIG. 1);

Figure 2:
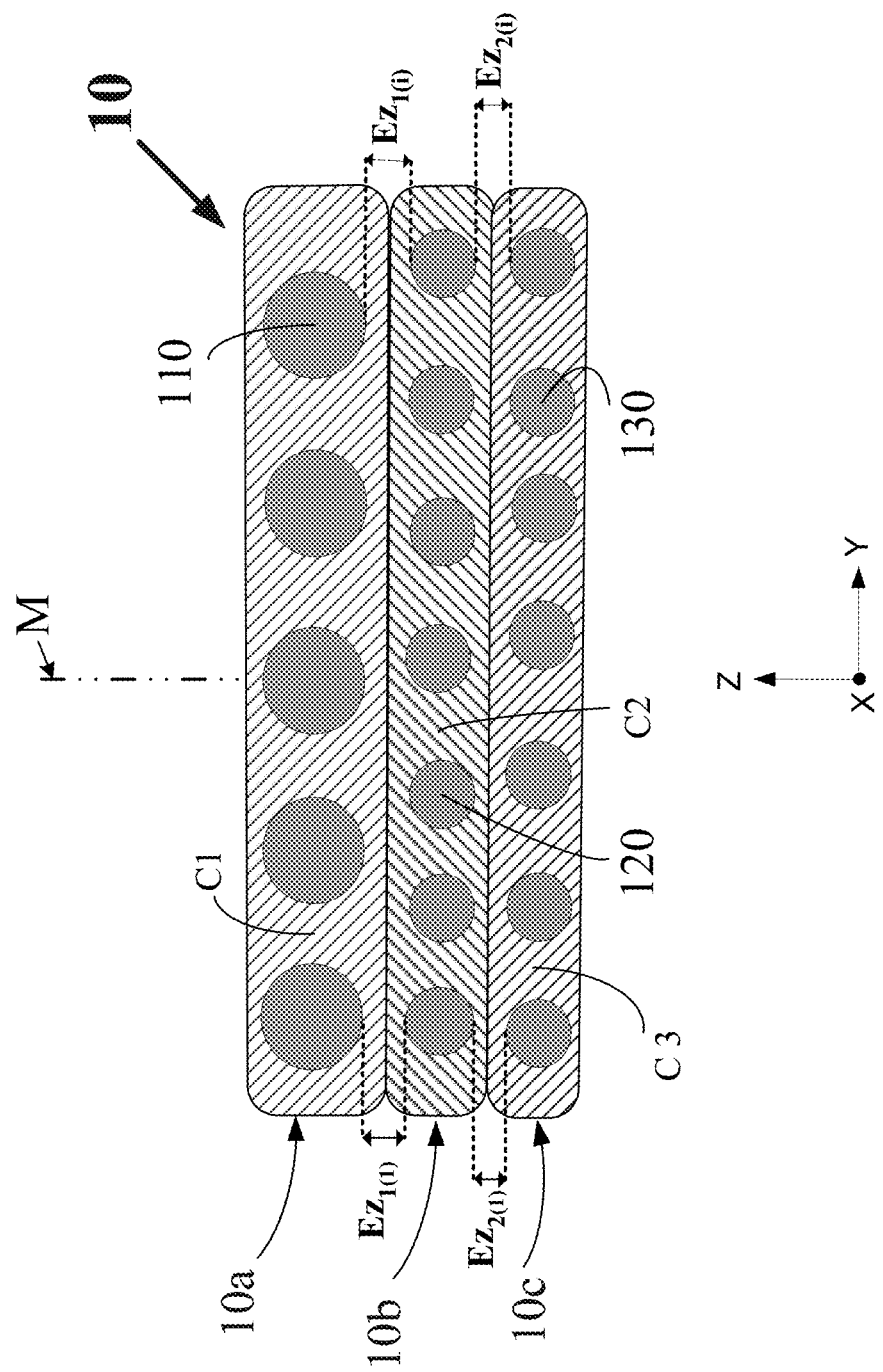

in cross section, the multilayer composite laminate (10a, 10b, 10c) used in the tyre (1) according to the invention (FIG. 2).

DEFINITIONS

Terms in the present application must be understood as follows:

"rubber" or "elastomer" (the two terms being considered to be synonymous): any type of elastomer, whether of the diene or non-diene, for example thermoplastic, type;

"rubber composition" or "rubbery composition": a composition containing at least one rubber and one filler;

"layer": a sheet, strip or any other element the thickness of which is relatively small in comparison with its other dimensions, preferably in which the ratio of thickness to the largest of the other dimensions is less than 0.5, more preferably less than 0.1;

"axial direction": a direction substantially parallel to the axis of rotation of the tyre;

"circumferential direction": a direction substantially perpendicular both to the axial direction and to a radius of the tyre (in other words, tangential to a circle the centre of which lies on the axis of rotation of the tyre);

"radial direction": a direction along a radius of the tyre, namely any direction passing through the axis of rotation of the tyre and substantially perpendicular to this direction, namely one that makes an angle of no more than 5 degrees with a perpendicular to this direction;

"oriented along an axis or in a direction" when speaking of any element such as a reinforcer means an element which is oriented substantially parallel to this axis or this direction, namely that makes an angle of not more than 5 degrees (which is therefore zero or at most equal to 5 degrees) with this axis or this direction;

"oriented perpendicular to an axis or a direction": when speaking of any element such as a reinforcer means an element which is oriented substantially perpendicular to this axis or this direction, namely that makes an angle that is not more than 5 degrees with a perpendicular to this axis or this direction;

"median circumferential plane" (denoted M): the plane perpendicular to the axis Y of rotation of the tyre which is situated mid-way between the two beads and passes through the middle of the crown reinforcement or belt;

"reinforcer" or "reinforcing thread": any long and slender strand, namely any longilinear, filiform strand of a length that is long in relation to its cross section, notably any individual filament, any multifilamentary fibre or any assembly of such filaments or fibres such as a folded yarn or a cord, it being possible for this strand or thread to be rectilinear or non-rectilinear, for example twisted, or crimped, such a strand or thread being able to reinforce a rubber matrix (namely to improve the tensile properties of the matrix);

"unidirectional reinforcers": reinforcers that are essentially mutually parallel, namely oriented along one and the same axis;

"laminate" or "multilayer laminate": within the meaning given by the international patent classification means any product comprising at least two layers, of planar or non-planar shape, which are in contact with one another, it being possible for these layers to be or not to be bonded or connected to each other; the expression "bonded" or "connected" is to be interpreted extensively as including all means of bonding or assembly, particularly by adhesive bonding.

Furthermore, unless expressly indicated otherwise, all the percentages (%) indicated are % by weight.

Any range of values denoted by the expression "between a and b" represents the range of values extending from more than a to less than b (namely excluding the end points a and b) where there is any range of values denoted by the expression "from a to b" means the range of values extending from a up to b (namely including the strict end points a and b).

DETAILED DESCRIPTION OF THE INVENTION

Figure 1:
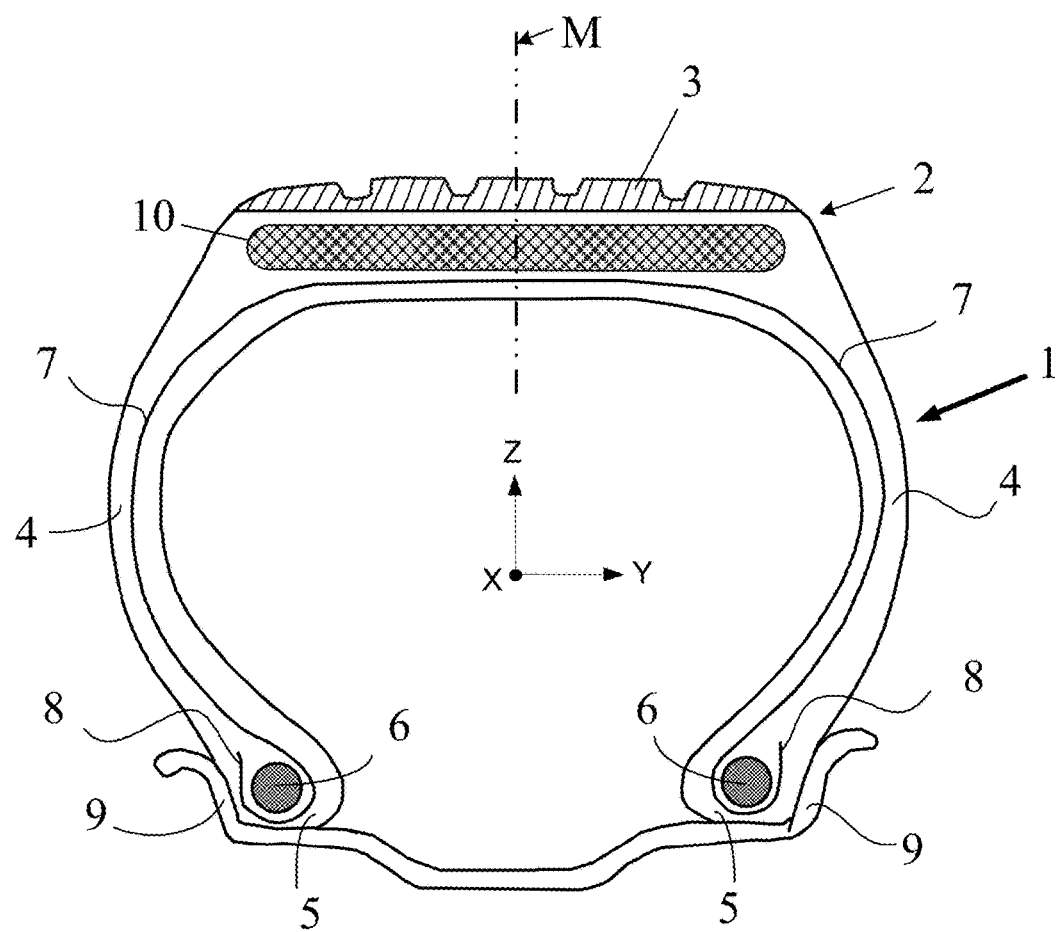

By way of example, FIG. 1 very schematically (namely without being drawn to any particular scale) depicts a radial section through a tyre according to the invention, for example for a vehicle of the passenger vehicle or van type, the belt of which comprises a multilayer composite laminate according to the invention.

This tyre (1) according to the invention, defining three perpendicular directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) anchored in each of the beads (5) and extending in the sidewalls (4) and in the crown (2), a crown reinforcement or belt (10) extending in the crown (2) in the circumferential direction (X) and situated radially between the carcass reinforcement (7) and the tread (3). The carcass reinforcement (7) is, in the known way, made up of at least one rubber ply reinforced with textile cords referred to as "radial", which are arranged practically parallel to one another and extend from one bead to the other so as to make an angle generally comprised between 80° and 90° with the median circumferential plane M; in this instance, by way of example, it is wrapped around two bead wires (6) in each bead (5), the turn-up (8) of this reinforcement (7) being, for example, arranged towards the outside of the tyre (1) which in this instance is depicted as mounted on its rim (9).

According to the present invention, and in accordance with the depiction of FIG. 2 which will be detailed later on, the belt (10) of the tyre (1) comprises a multilayer composite laminate comprising three superposed layers (10a, 10b, 10c) of reinforcers, the said reinforcers being unidirectional within each layer and embedded in a thickness of rubber (C1, C2, C3 respectively), with:

- on the tread side, a first layer of rubber (C1) comprising a first row of reinforcers (110) which are oriented at an angle alpha (α) of −5 to +5 degrees with respect to the circumferential direction (X), these reinforcers (110) referred to as first reinforcers being made of a heat-shrinkable textile material;
- in contact with and underneath the first layer (C1) a second layer of rubber (C2) comprising a second row of reinforcers (120) which oriented at a given angle beta ((β), positive or negative, are comprised between 10 and 30 degrees with respect to the circumferential direction (X), these reinforcers (120) referred to as secondary reinforcers being metal reinforcers;
- in contact with and underneath the second layer (C2), a third layer of rubber (C3) comprising a third row of reinforcers (130) which are oriented at an angle gamma (γ) the opposite of the angle beta, itself comprised between 10 and 30 degrees with respect to the circumferential direction (X), these reinforcers (130) referred to as third reinforcers being metal reinforcers.

According to the invention, the angles β and γ, of opposite direction, both comprised between 10° and 30°, may be identical or different, namely the second (120) and third (130) reinforcers may be arranged symmetrically or otherwise on each side of the median circumferential plane (M) previously defined.

In this tyre indicated schematically in FIG. 1, it will of course be appreciated that the tread 3, the multilayer laminate 10 and the carcass reinforcement 7 may or may not be in contact with one another, even though these parts have been deliberately separated in FIG. 1, schematically, for the sake of simplicity and to make the drawing clearer. They could be physically separated, at least in the case of some of them, for example by bonding rubbers, well known to those skilled in the art, intended to optimize the cohesion of the whole after curing or crosslinking.

In the tyre of the invention, the heat-shrinkable textile material of the first reinforcers (110) is a polyester; the mean envelope diameter D1 of these first reinforcers is comprised between 0.40 mm and 0.70 mm, preferably between 0.45 and 0.65 mm.

The second (120) and third (130) reinforcers consist of steel monofilaments of which the diameter, denoted D2 and D3 respectively, is comprised between 0.20 mm and 0.50 mm, preferably greater than 0.25 mm and less than 0.40 mm. More preferably, for optimum endurance of the tyre of the invention, notably under harsh running conditions, it is preferable for D2 and D3 to be comprised in a range from 0.28 to 0.35 mm.

A steel "monofilament" or "monothread" here means any individual steel filament, whatever the shape of its cross section, the diameter or thickness D of which is greater than 100 μm, D representing the shortest dimension of its cross section, when the latter is non-circular. This definition therefore covers both monofilaments of essentially cylindrical shape (with a circular cross section) and monofilaments of different shapes, for example oblong monofilaments (with flattened shape); in the latter instance (non-circular section), the ratio of the longest dimension to the shortest dimension of the cross section is preferably less than 50, more preferably less than 30, and in particular less than 20.

This tyre of the invention has, by way of further essential features, the following features:

- the density $d_1$ of the first reinforcers (110) in the first layer of rubber (C1), measured in the axial direction (Y), is comprised between 70 and 130 threads/dm (decimeter, namely per 100 mm of rubber layer);
- the density, denoted $d_2$ and $d_3$, of the second (120) and third (130) reinforcers in the second (C2) and third (C3) layers of rubber respectively, measured in the axial direction (Y), is comprised between 120 and 180 threads/dm, these features being in particular and preferably measured in the central part of the belt of the tyre in the vulcanized state, on each side of the median plane (M) over a total axial width of 4 cm (namely between −2 cm and +2 cm with respect to the median plane M).

On the other hand, and according to another preferred embodiment of the invention, the following features are satisfied:

- the mean thickness $Ez_1$ of rubber separating a first reinforcer 110 (of the first layer C1) from the second reinforcer 120 (of the second layer C2) closest to it, measured in the radial direction (Z), is comprised between 0.25 and 0.40 mm ;
- the mean thickness $Ez_2$ of rubber separating a second reinforcer 120 (of the second layer C2) from the third reinforcer 130 (of the third layer C3) closest to it, measured in the radial direction (Z), is comprised between 0.35 and 0.60 mm, these features being also measured in the central part of the belt of the tyre in the vulcanized state, on each side of the median plane (M) over a total axial width of 4 cm (namely between −2 cm and +2 cm with respect to the median plane M).

FIG. 2 schematically (and without being drawn to any particular scale) depicts, in cross section, the multilayer composite laminate (10a, 10b, 10c) used as a belt (10) in the tyre (1) according to the invention of FIG. 1.

As illustrated in FIG. 2, $Ez_1$ is the mean of the thicknesses ($Ez_{1(1)}$, $Ez_{1(2)}$, $Ez_{1(3)}$, ... $Ez_{1(i)}$) of rubber separating a first reinforcer (110) from the second reinforcer (120) closest to it, these thicknesses each being measured in the radial direction Z and averaged over a total axial distance comprised between −2.0 cm and +2.0 cm with respect to the centre of the belt (namely, for example, to a total of around 40 measurements if there are ten reinforcers (110) per cm in the layer C1).

Expressed differently, $Ez_1$ is the mean of the minimum distances $Ez_{1(i)}$ separating each first reinforcer (110) "back-to-back" from the second reinforcer (120) closest to it in the radial direction Z, this mean being calculated over all the first reinforcers (110) present in the central part of the belt, in an axial interval extending between −2 cm and +2 cm with respect to the median plane M.

Likewise, $Ez_2$ is the mean of the thicknesses of rubber ($Ez_{2(1)}$, $Ez_{2(2)}$, $Ez_{2(3)}$, . . . $Ez_{2(i)}$) separating a second reinforcer (120) from the third reinforcer (130) closest to it, measured in the radial direction Z, this mean being calculated over a total axial distance comprised between −2.0 cm and +2.0 cm with respect to the centre of the belt. Expressed another way, these thicknesses represent the minimum distances which separate the second reinforcer (120) "back-to-back" from the third reinforcer (130) closest to it in the radial direction Z.

Expressed another way, $Ez_2$ is the mean of the minimum distances $Ez_{2(i)}$ separating each second reinforcer (120) "back-to-back" from the third reinforcer (130) closest to it in the radial direction Z, this mean being calculated over all the second reinforcers (120) present in the central part of the belt, in an axial interval extending between −2 cm and +2 cm with respect to the median plane M.

The tyre of the invention preferably satisfies the following inequalities:

$$0.20 < Ez_1/(Ez_1 + D1 + D2) < 0.30;$$

$$0.30 < Ez_2/(Ez_2 + D2 + D3) < 0.50.$$

The thermal contraction (denoted CT) of the first reinforcers (110) made of heat-shrinkable textile material, after 2 min at 185° C., is preferably less than 3.5%, more preferably less than 3%, which values have proven to be optimal for the manufacturing and dimensional stability of tyre casings, particularly during the phases of curing and cooling thereof.

It is the relative contraction of these first reinforcers (110) under the test conditions listed hereinafter. The parameter CT is measured, unless specified otherwise, in accordance with the standard ASTM D1204-08, for example on an apparatus of the "TESTRITE" type under what is known as a standard pretension of 0.5 cN/tex (which is therefore expressed with respect to the titer or linear density of the test specimen being tested). At constant length, the maximum force of contraction (denoted $F_C$) is also measured using the above test, this time at a temperature of 180° C. and under 3% elongation. This force of contraction $F_C$ is preferably higher than 20 N (Newtons). A high force of contraction has proven to be particularly beneficial to the hooping capability of the first reinforcers (110) made of heat-shrinkable textile material with respect to the crown reinforcement of the tyre when the tyre heats up under high running speeds.

The above parameters CT and Fc can be measured indistinctly on the adhesive coated initial textile reinforcers before they are incorporated into the laminate and then the tyre or alternatively can be measured on these reinforcers once they have been extracted from the central zone of the vulcanized tyre and preferably "derubberized" (namely rid of the rubber which coats them in the layer C1).

Any heat-shrinkable textile material made of polyester is suitable, particularly those satisfying the contraction features CT mentioned hereinabove. Among preferred polyesters mention may for example be made of PET (polyethylene terephthalate), PEN (polyethylene naphthalate), PBT (polybutylene terephthalate), PBN (polybutylene naphthalate), PPT (polypropylene terephthalate), PPN (polypropylene naphthalate). Preferably, the polyester is a PET or a PEN, more particularly a PET. More preferably still, the polyester used is an HMLS (High Modulus Low Shrinkage) PET.

The first reinforcers made of heat-shrinkable material may have any known form, admittedly they may be monofilaments but they are more usually made up of multifilament fibres twisted together in the form of textile cords. The envelope diameter means, in the usual way, the diameter of the imaginary cylinder of revolution that surrounds such first reinforcers in the general case of these reinforcers not being of circular cross section (contrary to the simple case of individual filaments).

According to one preferred embodiment of the invention, for an optimized performance of the tyre of the invention in terms of rolling resistance, drift thrust and running endurance, at least one and more preferably all of the following features are satisfied:

the density $d_1$ is comprised between 80 and 120 threads/dm, more preferably between 90 and 110 threads/dm;

the densities $d_2$ and $d_3$ are each comprised between 130 and 170 threads/dm;

the thickness $Ez_1$ is comprised between 0.25 and 0.35 mm, more preferably between 0.275 mm and 0.325 mm;

the thickness $Ez_2$ is comprised between 0.35 and 0.55 mm, more preferably between 0.375 mm and 0.525 mm;

the total thickness of the multilayer composite laminate, namely of its three superposed layers (C1, C2, C3), measured in the radial direction Z, is comprised between 1.8 and 2.7 mm, more preferably between 2.0 and 2.5 mm.

According to another preferred embodiment, which may or may not be combined with any one or all of the above-mentioned preferred features, at least one of the inequalities indicated hereinbelow and more preferably all of the inequalities indicated hereinbelow is or are satisfied:

$$0.225 < Ez_1/(Ez_1 + D1 + D2) < 0.275$$

$$0.325 < Ez_2/(Ez_2 + D2 + D3) < 0.475$$

$$0.325 < (Ez_1 + Ez_2)/(Ez_1 + Ez_2 + D1 + D2 + D3) < 0.425.$$

The first reinforcers (110) made of heat-shrinkable textile material, may adopt any known shape, they may for example be elementary monofilaments of large diameter (for example equal to or greater than 50 μm), multifilament fibres (consisting of a plurality of elementary filaments of small diameter, typically less than 30 μm), textile folded yarns formed of several fibres twisted together, textile cords formed of several fibres or monofilaments cabled or twisted together.

By definition, the second (120) and third (130) reinforcers are, by definition, steel monofilaments. For preference, the steel is a carbon steel such as the steels used in cords of the "steel cords" type for tyres; however it is of course possible to use other steels, for example stainless steels, or other alloys.

According to one preferred embodiment, when a carbon steel is used, its carbon content (% by weight of steel) is comprised in a range from 0.8% to 1.2%; according to another preferred embodiment, the carbon content of the steel is comprised in a range from 0.6% to 0.8%. The invention applies in particular to steels of the normal tensile (NT) or high tensile (HT) steel cord type, the (second and third) reinforcers made of carbon steel then having a tensile strength (Rm) preferably higher than 2000 MPa, more preferably higher than 2500 MPa. The invention also applies to super high tensile (SHT), ultra high tensile (UHT) or megatensile (MT) steels of the steel cord type, the (second and third) reinforcers made of carbon steel then having a tensile strength (Rm) preferably higher than 3000 MPa, more preferably higher than 3500 MPa. The total elongation at break (At) of these reinforcers, which is the sum of the elastic elongation and of the plastic elongation, is preferably greater than 2.0%.

As far as the (second and third) reinforcers made of steel are concerned, the measurements of force at break, strength at break denoted Rm (in MPa) and elongation at break, denoted At (total elongation in %) are taken under tension in accordance with ISO standard 6892 of 1984.

The steel used, whether in particular it is a carbon steel or a stainless steel, may itself be coated with a metallic layer which for example improves the workability of the steel monofilament or the wear properties of the reinforcer and/or of the tyre themselves, such as properties of adhesion, corrosion resistance or even resistance to ageing. According to one preferred embodiment, the steel used is covered with a layer of brass (Zn—Cu alloy) or zinc; it will be recalled that during the thread manufacturing process, coating the thread with brass or zinc makes the thread easier to draw and encourages the thread to bond to the rubber. However, the reinforcers could be covered with a thin layer of metal other than brass or zinc, having for example the function of improving the corrosion resistance of these threads and/or their adhesion to the rubber, for example a thin layer of Co, Ni, Al, of an alloy of two or more of the Cu, Zn, Al, Ni, Co, Sn compounds.

Each layer (C1, C2, C3) of rubber composition (or hereinafter "layer of rubber") of which the multilayer composite laminate is made is based on at least one elastomer and one filler.

For preference, the rubber is a diene rubber, which, it will be recalled, means any elastomer (single elastomer or blend of elastomers) which is derived, at least in part (i.e. a homopolymer or copolymer) from diene monomers, namely monomers which bear two carbon-carbon double bonds, regardless as to whether or not these are conjugated.

This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment is to use an "isoprene" elastomer, namely a homopolymer or a copolymer of isoprene or, in other words, a diene elastomer selected from the group consisting of natural rubber (NR), synthetic polyisoprenes (IR), the various copolymers of isoprene and blends of these elastomers.

The isoprene elastomer is preferably natural rubber or a synthetic polyisoprene of cis-1,4 type. Of these synthetic polyisoprenes use is preferably made of polyisoprenes having a content (mol %) of cis-1,4 bonds higher than 90%, more preferably still higher than 98%. According to one preferred embodiment, each layer of rubber composition contains 50 to 100 phr of natural rubber. According to other preferred embodiments, the diene elastomer may consist, in full or in part, of another diene elastomer such as, for example, an SBR elastomer used cut or not cut with another elastomer, for example of the BR type.

Each rubber composition may contain a single or several diene elastomer(s), also all or some of the additives usually employed in the rubber matrices intended for the manufacture of tyres, such as, for example, reinforcing fillers such as carbon black or silica, coupling agents, antiageing agents, antioxidants, plasticizers or extension oils, whether the latter are aromatic or nonaromatic in nature (notably oils that are very weakly if at all aromatic, for example of the naphthene or paraffin type, with high or preferably low viscosity, MES or TDAE oils), plasticizing resins with a high glass transition temperature (higher than 30° C.), agents that improve the processability of the compositions in the raw state, tackifying resins, antireversion agents, methylene acceptors and donors such as HMT (hexamethylenetetramine) or H3M (hexamethoxymethylmelamine) for example, reinforcing resins (such as resorcinol or bismaleimide), known adhesion promoter systems of the metal salt type, for example, notably salts of cobalt, nickel or lanthanide, a crosslinking or vulcanizing system.

For preference, the crosslinking system for the rubber composition is a system referred to as a vulcanizing system, namely one based on sulphur (or a sulphur donor agent) and a primary vulcanization accelerator. Various known vulcanization activators or secondary accelerators may be added to this basic vulcanization system. Sulphur is used at a preferred rate of between 0.5 and 10 phr, the primary vulcanization accelerator, for example a sulphenamide, is used at a preferred rate comprised between 0.5 and 10 phr. The level of reinforcing filler, for example carbon black and/or silica, is preferably higher than 30 phr, notably comprised between 30 and 100 phr.

All carbon blacks, notably blacks of the HAF, ISAF, SAF type, conventionally used in tyres (blacks referred to as tyre grade blacks) are suitable by way of carbon black. In this category more particular mention will be made of carbon blacks of (ASTM) grade 300, 600 or 700 (for example N326, N330, N347, N375, N683, N772). Precipitated or pyrogenated silicas having a BET surface area of less than 450 $m^2/g$, preferably from 30 to 400 $m^2/g$ are notably suitable by way of silicas.

A person skilled in the art will know, in the light of the present description, how to adjust the formulation of the rubber compositions in order to reach the desired levels of properties (notably elastic modulus) and adapt the formulation to suit the specific application envisaged.

For preference, each rubber composition in the cross-linked state has a secant modulus in extension, at 10% elongation, comprised between 4 and 25 MPa, more preferably between 4 and 20 MPa; values notably comprised between 5 and 15 MPa have proven themselves particularly suitable. Modulus measurements are made under tension, unless otherwise indicated in accordance with the standard ASTM D 412 of 1998 (test specimen "C"): the "true" secant modulus (which means the modulus with respect to the actual cross section of the test specimen) is measured in second elongation (namely after an accommodation cycle) at 10% elongation, this being denoted here as Ms and expressed in MPa (under standard temperature and relative humidity conditions in accordance with standard ASTM D 1349 of 1999).

In order to cause the first, second and third reinforcers to adhere to their three respective layers of rubber (C1, C2, C3) described hereinabove, use may be made of any suitable adhesive system, for example a textile glue of the "RFL" (resorcinol-formaldehyde-latex) or equivalent type as far as the first textile reinforcers are concerned, or for example an adhesive coating such as brass or zinc as far as the second and third reinforcers made of steel are concerned; however, it is also possible to use a plain, i.e. non-coated, steel.

EXEMPLARY EMBODIMENTS OF THE INVENTION

The tests which follow demonstrate that, by virtue of its specific construction, the multilayer composite laminate according to the invention makes it possible to reduce the weight and therefore the rolling resistance of the tyres, at a cost that is lower thanks to the use of non-cabled steel monofilaments, all this being achieved first and foremost without impairing the cornering stiffness or overall endurance of these tyres.

These comparative tests were carried out on passenger vehicle tyres of size 205/55 R16, manufactured in the conventional way and identical in all respects except for the construction of their multilayer composite laminate.

A) Tyres Tested

In the tyres according to the invention of these examples, according to the schematic depiction of FIG. 2, the reinforcers (110) are folded yarns made of polyester with a low thermal contraction (HMLS PET "1×50" from Performance Fibers), each folded yarn consisting of 2 spun yarns of 110 tex which have been twisted together (on a direct cabling machine) at 470 turns/meter; their diameter D1 is equal to approximately 0.54 mm; their CT is equal to approximately 2.4% and their force of contraction Fc is equal to approximately 22 N.

The first layer of rubber (C1) covering the textile reinforcers (110) is a rubber composition that is conventional for the calendering of textile reinforcers, based on natural rubber, carbon black, a vulcanizing system and the usual additives; adhesion between the polyamide folded yarns and the layer of rubber is ensured in the known way for example using a simple textile glue of the "RFL" (resorcinol-formaldehyde-latex) type.

To manufacture this first layer (C1) the textile folded yarns (110) were calendered between two layers of rubber composition in the raw (unvulcanized) state, each having a thickness of approximately 0.25 mm, in a way well known to those skilled in the art.

The metal reinforcers (120) and (130) are micro-alloyed carbon steel monofilaments (0.9% carbon and 0.2% Cr) of UHT type having the strength Rm of the order of 3650 MPa (breaking force 258 N), a total elongation At of 2.3%, and a diameter (D2, D3) of 0.30 mm.

The second (C2) and third (C3) layers of rubber covering these steel monofilaments (120, 130) consist of a composition that is conventional for the calendering of metal tyre belt plies, typically based on natural rubber, silica, a vulcanizing system and the usual additives such as cobalt salts by ways of adhesion promoters.

To manufacture these two layers (C2, C3), monofilaments (130) were calendered between two layers of rubber composition in the raw (unvulcanized) state, each having a thickness of around 0.32 mm, in a way well known to those skilled in the art.

The density $d_1$ of the textile folded yarns (110) in the first layer (C1), measured in the axial direction (Y), is equal to approximately 100 threads/dm, that ($d_2$ et $d_3$ respectively) of the second (120) and third (130) steel monofilaments is equal to approximately 160 threads/dm.

Thus, in a range extending axially between −2 cm and +2 cm on each side of the median plane M there are approximately 40 (namely 20 on each side) textile folded yarns (110) and approximately 64 (namely 32 on each side) second (120) and third (130) steel monofilaments.

The measured mean thickness $Ez_1$ of rubber separating these textile folded yarns (110) from the steel monofilaments (120) was approximately 0.28 mm while the mean thickness $Ez_2$ of rubber separating the steel monofilaments (120) from the other steel monofilaments (130) was around 0.45 mm. The total mean thickness of the laminate according to the invention, measured in the radial direction, was approximately 2.1 mm.

Thus, in this example according to the invention, it will be noted that the three inequalities hereinbelow which are particularly preferred, are indeed satisfied:

$$0.225 < Ez_1/(Ez_1+D1+D2) < 0.275$$

$$0.325 < Ez_2/(Ez_2+D2+D3) < 0.475$$

$$0.325 < (Ez_1+Ez_2)/(Ez_1+Ez_2+D1+D2+D3) < 0.425.$$

All the data (D1, D2, D3, $d_1$, $d_2$, $d_3$, $Ez_1$ and $Ez_2$) indicated above are mean values measured experimentally by an operator on photographs of radial sections of tyres taken through the central part of the belt, as indicated previously 2 cm on either side of the median plane (M).

The control tyres used have the same architecture as the tyres of the invention except for the following technical features: the metal reinforcers (120, 130) consist of conventional "2.30" design cords of SHT steel (Rm equal to approximately 3170 MPa; rupture force to 450 N) consisting of 2 threads of diameter 0.30 mm cabled together at a pitch of 14 mm; the diameter (envelope) of these cords is therefore 0.6 mm; they are arranged at a density of around 85 threads/dm; the reinforcers (110) are folded yarns made of polyamide 66, each folded yarn consisting of 2 spun yarns of 140 tex which have been twisted together (on a direct cabling machine) at 250 turns/meter, with a diameter D1 equal to approximately 0.66 mm; their CT is equal to approximately 7% and their force of contraction Fc is equal to approximately 28 N; the measured mean thickness $Ez_1$ of rubber separating the nylon folded yarns (110) from the steel cords (120) was approximately 0.31 mm while the measured mean thickness $Ez_2$ of rubber separating the steel cords (120) was of the order of 0.50 mm. The total mean thickness of the laminate, measured in the radial direction, was around 3.0 mm.

To manufacture the two metal layers hereinabove, "2.30" cords were calendered between two layers of rubber composition in the raw (unvulcanized) state, each having a thickness of approximately 0.40 mm in a way well known to those skilled in the art.

In the multilayer composite laminate of these control tyres it may in particular be noted that, unlike in the case of the invention, neither one of the following preferred inequalities is satisfied:

$$0.20 < Ez_1/(Ez_1+D1+D2) < 0.30;$$

$$0.30 < Ez_2/(Ez_2+D2+D3) < 0.50.$$

B) Results of Comparative Tests

In a first series of tests carried out on machines it was first of all noted that the tyres of the invention, as compared with the control tyres, offered:

a weight saving of around 14% on the multilayer composite laminate, namely a weight saving of around 2.5% on the tyre itself;

an approximately 3.3% improvement in rolling resistance (representing approximately 0.250 kg/tonne);

and unexpectedly, despite this appreciable lightening of the belt, exactly the same drift thrust.

The rolling resistance was measured on a dynamometer according to the ISO 87-67 (1992) method. To measure the drift thrust, each tyre was driven at a constant speed of 80 km/h on a suitable automatic machine (machine of the "flat-track" type marketed by MTS), varying the load denoted "Z", for a cornering angle of 1 degree, and the cornering rigidity or drift thrust denoted "D" (corrected for the thrust at zero drift) was measured in the known way by recording, using sensors, the transverse load on the wheel as a function of this load Z; the drift thrust is the gradient of the D(Z) curve at the origin.

Next, actual running tests were then performed either on the machine or on a vehicle (a Volkswagen Golf) to compare the endurance of the control tyres and the tyres according to the invention under various driving conditions.

First of all, the endurance for very high speed driving was assessed by subjecting each tyre, on the machine, to a progressive increase in speed, in determined steps, up to a preset limiting speed (in excess of 250 km/h) or where applicable until the tyres tested became destroyed before the end of the test.

Next, the endurance under very heavy cornering was evaluated by driving the vehicle around a very bendy circuit, under conditions of overload, underinflation and according to various cycles of predetermined speeds giving rise to very high transverse accelerations, all of this over 1000 km; after this particularly harsh test, each tyre tested was stripped (by destructive analysis) and where applicable the number of ruptures in the metal reinforcers (120, 130) in the relevant layers (C2, C3) of the multilayer composite laminate was counted.

Finally, endurance for very long time driving (40 000 km) under very harsh conditions was also tested, on an automatic running machine, according to various predetermined pressure and overload cycles at constant speed; after that, each tested tyre was stripped and the overall condition of its multilayer composite laminate was observed, particularly in the shoulder regions of the tyres which as is known suffer the greatest heating.

At the end of this second series of tests it was found that the tyres according to the invention, as compared with the control tyres, exhibited, to the surprise of those skilled in the art:

- equivalent endurance for high-speed running (no noted destruction of the tyres tested in both cases);
- endurance under very heavy cornering that was likewise equivalent (no observed rupture of the metal reinforcers in both cases);
- finally, very long term driving endurance that was improved under extremely harsh running conditions (better appearance of the multilayer composite laminate according to the invention).

Thus, provided that all of the essential technical features explained hereinabove are observed, notably provided that, on the one hand, use is made of textile circumferential reinforcers (110) made of polyester, in particular with low heat-shrinkability, and, on the other hand, of metal reinforcers (120, 130) in the form of small-diameter monofilaments, within the recommended limits of building, it was found that it was still possible appreciably to reduce the overall thickness of the tyre belts without impeding the workability and differentiation of the functions firstly of hooping afforded by the circumferential reinforcers of the first layer and secondly of stiffening afforded by the metal reinforcers of the other two layers.

Unexpectedly, the invention allows the weight and rolling resistance of passenger vehicle or van tyres to be reduced without impairing the cornering stiffness and, therefore, road holding and handling, while at the same time offering running endurance that is at least equivalent if not better, even under particularly harsh running conditions.

The invention claimed is:

1. A radial tyre comprising:
   a crown;
   a tread surmounting the crown;
   two beads;
   two sidewalls, each sidewall connecting a corresponding one of the beads to the crown;
   a carcass reinforcement anchored in each of the beads and extending in the sidewalls and the crown; and
   a belt extending in the crown in a circumferential direction (X) and situated radially between the carcass reinforcement and the tread, the belt including a multilayer composite laminate,
   wherein the multilayer composite laminate includes at least three superposed layers of reinforcers such that, for each layer, reinforcers in the layer are unidirectional and are embedded in a thickness of rubber, with:
     on a side towards the tread, a first layer of rubber including a row of first reinforcers, which are oriented at an angle alpha of −5 to +5 degrees with respect to the circumferential direction (X), the first reinforcers being heat-shrinkable polyester textile reinforcers,
     in contact with the first layer of rubber and arranged underneath the first layer of rubber, a second layer of rubber including a row of second reinforcers, which are oriented at an angle beta, the angle beta being positive or negative and having a value between 10 and 30 degrees with respect to the circumferential direction (X), the second reinforcers being metal reinforcers, and
     in contact with the second layer of rubber and arranged underneath the second layer of rubber, a third layer of rubber including a row of third reinforcers, which are oriented at an angle gamma, the angle gamma being opposite in direction to the angle beta and having a value between 10 and 30 degrees with respect to the circumferential direction (X), the third reinforcers being metal reinforcers,
   wherein:
     a mean envelope diameter D1 of the first reinforcers is between 0.40 mm and 0.70 mm,
     a density d1 of the first reinforcers in the first layer of rubber, measured in an axial direction (Y), is between 70 and 130 threads/dm,
     the second reinforcers are steel monofilaments having a diameter D2 between 0.20 mm and 0.50 mm,
     the third reinforcers are steel monofilaments having a diameter D3 between 0.20 mm and 0.50 mm,
     a density d2 of the second reinforcers in the second layer of rubber, measured in the axial direction (Y), is between 120 and 180 threads/dm, and
     a density d3 of the third reinforcers in the third layer of rubber, measured in the axial direction (Y), is between 120 and 180 threads/dm, and
   wherein, measured in a central part of the belt when the tyre is in a vulcanized state, on each side of a median plane (M) over a total axial width of 4 cm:
     a mean thickness $Ez_1$ of rubber separating a first reinforcer from a second reinforcer closest to the first reinforcer, measured in a radial direction (Z), is between 0.25 and 0.40 mm,
     a mean thickness $Ez_2$ of rubber separating a second reinforcer from a third reinforcer closest to the second reinforcer, measured in the radial direction (Z), is between 0.35 and 0.60 mm, and
     $Ez_1 < Ez_2$.

2. The tyre according to claim 1, wherein the diameter D1 is between 0.45 mm and 0.65 mm.

3. The tyre according to claim 1, wherein the density d1 is between 80 and 120 threads/dm.

4. The tyre according to claim 1, wherein each of the diameters D2 and D3 is greater than 0.25 mm and less than 0.40 mm.

5. The tyre according to claim 1, wherein each of the densities d2 and d3 is between 130 and 170 threads/dm.

6. The tyre according to claim 1, wherein a thermal contraction CT of the first reinforcers, after 2 minutes at 185° C., is less than 3.5%.

7. The tyre according to claim 1, wherein a thermal contraction CT of the first reinforcers, after 2 minutes at 185° C. is less than 3.0%.

8. The tyre according to claim 1, wherein $$0.20 < Ez_1/(Ez_1+D1+D2) < 0.30, \text{ and}$$

$$0.30 < Ez_2/(Ez_2+D2+D3) < 0.50.$$

9. The tyre according to claim 8, wherein $$0.325 < Ez_2/(Ez_2+D2+D3) < 0.475.$$

10. The tyre according to claim 1, wherein the thickness $Ez_1$ is between 0.25 and 0.35 mm.

11. The tyre according to claim 1, wherein the thickness $Ez_2$ is between 0.35 and 0.55 mm.

12. The tyre according to claim 1, wherein $$0.225 < Ez_1/(Ez_1+D1+D2) < 0.275.$$

13. The tyre according to claim 1, wherein $$0.325 < (Ez_1+Ez_2)/(Ez_1+Ez_2+D1+D2+D3) < 0.425.$$

14. The tyre according to claim 1, wherein the steel of the second and third reinforcers is a carbon steel.

15. The tyre according to claim 1, wherein the polyester is a polyethylene terephthalate (PET) or a polyethylene naphthalate (PEN).

16. The tyre according to claim 15, wherein the polyester is a High Modulus Low Shrinkage (HMLS) PET.

17. The tyre according to claim 1, wherein the angle beta is equal to the angle gamma.

\* \* \* \* \*

UNITED STATES PATENT AND TRADEMARK OFFICE
CERTIFICATE OF CORRECTION

PATENT NO. : 9,902,204 B2
APPLICATION NO. : 14/372947
DATED : February 27, 2018
INVENTOR(S) : Aurore Lardjane It is certified that error appears in the above-identified patent and that said Letters Patent is hereby corrected as shown below:

In the Specification

Column 1:
Line 8, "thereof" should read --thereof.--.

Column 5:
Line 30, "((3)," should read --(β),--.

Signed and Sealed this
Twenty-second Day of May, 2018

Andrei Iancu
*Director of the United States Patent and Trademark Office*